United States Patent [19]

Supik

[11] Patent Number: 4,770,315
[45] Date of Patent: Sep. 13, 1988

[54] SHAPED BODY MADE OF A POORLY WELDABLE MATERIAL

[75] Inventor: Helmuth-G. Supik, Sarstedt, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 873,820

[22] Filed: Jun. 11, 1986

[30] Foreign Application Priority Data

Jun. 25, 1985 [DE] Fed. Rep. of Germany ....... 3522646

[51] Int. Cl.⁴ ............................................. B65D 6/32
[52] U.S. Cl. .............................. 220/75; 220/DIG. 29
[58] Field of Search ......................... 220/75, DIG. 29

[56] References Cited

U.S. PATENT DOCUMENTS

| | | | |
|---|---|---|---|
| 1,290,091 | 1/1919 | Cole | 220/DIG. 29 |
| 2,209,290 | 7/1940 | Watts | 220/DIG. 29 |
| 2,371,823 | 3/1945 | Jackson | 220/DIG. 29 |
| 2,372,712 | 4/1945 | Crawford | 220/75 |
| 2,970,719 | 2/1961 | Brady | 220/75 |
| 3,596,793 | 8/1971 | Kocher | 220/DIG. 29 |

Primary Examiner—George E. Lowrance
Attorney, Agent, or Firm—Walter Ottesen

[57] ABSTRACT

The invention is directed to a shaped body made of a metal material which provides poor welding results and which is used especially for conduits, containers or the like for making chemical equipment for use in corrosive mediums. The shaped body is at least partially covered with a covering material on the side which is in contact with the medium. To provide good corrosion-resistance for the shaped body, it is partially or completely covered with a fixedly applied material of a similar kind.

15 Claims, 1 Drawing Sheet

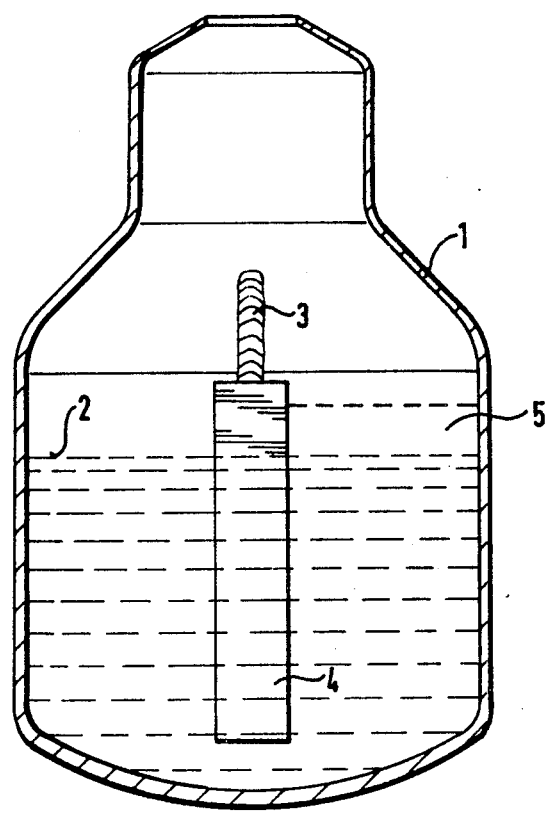

SHAPED BODY MADE OF A POORLY WELDABLE MATERIAL

FIELD OF THE INVENTION

The invention relates to a shaped body such as a conduit; container or the like made of a poorly weldable metal material. The shaped body is intended to be used especially in making chemical apparatus for use with corrosive mediums such as boiling nitric acid. The shaped body is at least partially covered with a covering material.

BACKGROUND OF THE INVENTION

In reprocessing nuclear fuels using the PUREX process, containers and other equipment are exposed to corrosive flows containing nitric acid. It is therefore necessary to use a steel which has a high level of resistance to corrosion. It was found that high-alloy steels which in themselves are resistant to corrosion have a lower service life at their join which in most cases is a welded seam. The welding operation gives rise to thermal cracks and changes in structure in the welded seam, and such phenomena have an adverse effect on the corrosion performance of the welded seam, in comparison with the main material.

SUMMARY OF THE INVENTION

It is an object of the invention to provide a shaped body of the kind described above which has a good resistance to corrosion. The resistance to corrosion of the shaped body is also good in the area of the join.

According to a feature of the shaped body of the invention, the shaped body is at least partially covered with a fixedly applied material of the same kind.

A very large number of different forms of platings are known. Notwithstanding that the plating art is one hundred years old, plating with materials of the same kind, for this purpose, is not known. Attention is directed to the journal "Blech, Rohre, Profile" 29 (1982 4, pages 176 and 177) as well as the paper from Thyssen AG entitled "Plattierte Erzeugnisse", February 1983 edition. The table for plated products does not include material pairing with the main material and covering material being of the same kind.

The invention provides for using a plating of a metal material of the same kind as the main body. There is no possibility of galvanic corrosion in the event of damage to the fixedly applied covering as the main body and the covering are of the same material. Another advantage is that there is no need to cover the entire surface of the shaped body, which is exposed to the corrosive medium, with such a covering in order to achieve a satisfactory degree of resistance to corrosion with respect to the entire shaped body.

According to another feature of the invention, only the join of the shaped body is covered by a covering with the same material as the shaped body. Thus, the join is provided with a covering material which is the same as the main body. If the join is produced by riveting, threaded fasteners, retaining rings or the like, it is possible to completely cover the side which is in contact with the medium, or to provide a covering only at the join. If the join is a welded seam, the material covering of the same kind, which covers over the welded seam, prevents a deterioration in the corrosion performance of the welded seam.

In an advantageous embodiment of the invention, the join is a welded seam which is covered by means of a plating with material of the same kind as the material of the shaped body. Containers used in chemical process technology may advantageously be of such a construction.

The covering may be produced by explosion plating or by being sprayed on. The explosive plating is described, for example, in "Handbuch der Schweisstechnik", by J. Ruge, Volume II, pages 141 to 143, Springer-Verlag Berlin Heidelberg New York 1980. If the sprayed-on covering is shot-peened after applying the same, the surface pores are closed as a result thereof. This provides for a further resistance to corrosion.

According to another feature of the invention, the material for the main body and the material for the coating could comprise steel X 2 Cr 18 Ni 15 Si 4 (German material number 1.4361). This material provides the best possible resistance to corrosion because the above-specified high silicon-bearing chrome-nickel steel X 2 Cr 18 Ni 15 Si 4 as the basic material for the shaped body has provided the best level of resistance to corrosion. That is attributed to the fact that this material does not suffer from intercrystalline corrosion (or grain disintegration). This austenitic chrome nickel steel has a tendency however to give rise to thermal cracking and changes in structure when it is welded. The welded seam is now covered over by a coating of the same material as the main material.

The choice in accordance with a feature of the invention of the highly corrosion-resistant, high silicon-bearing chrome nickel steel and covering over the welded seam with material of the same kind results in a shaped body which does not have any weak points at which it can be corrosively attacked by the corrosive mediums.

By virtue of the invention, there is no need for the entire surface of the shaped body which is in contact with the medium to be plated, as is necessary when using the known platings comprising titanium, zirconium or tantalum. It is only necessary to plate the region of the welded seam or the join, beneath the surface of the liquid and at the two-phase boundary.

In accordance with the invention, a shaped body is used as an item of process equipment for the chemical reprocessing of nuclear fuels, such as dissolving apparatus, evaporators and the like.

BRIEF DESCRIPTION OF THE DRAWING

The drawing shows a shaped body according to the invention which is shown here in the form of an evaporator container.

DESCRIPTION OF THE PREFERED EMBODIMENT OF THE INVENTION

An evaporator container 1 is constructed from a steel plate of material 1.4361, referred to above, which is silicon-bearing and has a high level of resistance to corrosion. The container 1 is shown with a corrosive liquid, for example contaminated nitric acid, which fills the container up to the level 2. The container 1 is joined together by means of a welded seam 3 which extends to a level beneath the surface 2 of the liquid. The welded seam 3 is covered over by a metal material covering 4 which was produced by means of explosive plating and which extends beyond the two-phase boundary 5 so that the medium in the container 1 cannot come into contact with the welded seam 3 and no corrosive action can occur in the region of the welded seam 3. The metal plating 4 is made from the same material 1.4361 as the container 1.

It is understood that the foregoing description is that of the preferred embodiments of the invention and that various changes and modifications may be made thereto without departing from the spirit and scope of the invention as defined in the appended claims.

What is claimed is:

1. A shaped body such as a conduit, container or the like such as for making chemical equipment for use in corrosive mediums such as boiling nitric acid for example, the shaped body comprising:
    a base structure including two parts both made of a poorly weldable first metal material being itself a material having a high resistance to corrosion and said parts conjointly defining an interface;
    join means for joining said parts at said interface; and,
    a covering made of a second metal material substantially the same as said first metal material and therefore itself likewise having a high resistance to corrosion, said covering being fixedly attached directly to said two parts and over said join means to cover the latter to prevent the corrosive mediums from attaching said join means while at the same time imparting a substantially uniform resistance to corrosion to said body over its inner surface.

2. The shaped body of claim 1, said covering being made of the same material as said base structure and being applied over only said join means.

3. The shaped body of claim 1, said join means being a weld seam and said covering being a plating made of said second metal material.

4. The shaped body of claim 1, said covering being a plating applied by explosion plating.

5. The shaped body of claim 1, said covering being a coating applied by spraying said second metal material onto said base structure.

6. The shaped body of claim 5, said coating being shot-peened after being applied to said base structure.

7. The shaped body of claim 1, said poorly weldable first metal material being a high-alloy corrosion resistant steel, said covering being a plating made of said high-alloy corrosion resistant steel.

8. The shaped body of claim 7, said material of said base structure and of said plating being a high silicon-bearing chrome nickel steel.

9. The shaped body of claim 8, said material of said base structure and of said plating being steel known as X 2 Cr 18 Ni 15 Si 4 (German material number 1.4361).

10. The shaped body of claim 1, said poorly weldable first metal material being a high-alloy corrosion resistant steel, said covering being a sprayed-on coating made of said high-alloy corrosion resistant steel.

11. The shaped body of claim 10, said material of said base structure and of said coating being a high silicon-bearing chrome nickel steel.

12. The shaped body of claim 11, said material of said base structure and said coating being steel known as X 2 Cr 18 Ni 15 Si 4 (German material number 1.4361).

13. The shaped body of claim 1, said shaped body being a structure selected from the group consisting of a dissolution apparatus and an evaporator for use in chemically reprocessing nuclear fuels.

14. A shaped body such as a conduit, container or the like such as for making chemical equipment for use in corrosive mediums such as boiling nitric acid for example, the shaped body comprising:
    a base structure including two parts both made of a poorly weldable first metal material being itself a material having a high resistance to corrosion and conjointly defining an interface;
    a weld seam formed along said interface for attaching said two parts to each other with the weld seam developing inherent thermal cracks and changes in structure thereby adversely affecting the corrosion performance of the shaped body at the weld seam; and,
    a plating made of the same material as said base structure and being applied over said weld seam to prevent the corrosive mediums from attacking said weld seam while at the same time imparting a substantially uniform resistance to corrosion to said body over its inner surface.

15. The shaped body of claim 14, said two parts and said plating all being made of austenitic chrome nickel steel.

* * * * *

UNITED STATES PATENT AND TRADEMARK OFFICE
CERTIFICATE OF CORRECTION

PATENT NO.  : 4,770,315
DATED       : September 13, 1988
INVENTOR(S) : Helmth-G. Supik It is certified that error appears in the above-identified patent and that said Letters Patent is hereby corrected as shown below:

In column 1, line 7: delete "conduit;" and substitute -- conduit, -- therefor.

In column 2, line 53: delete "PREFERED" and substitute -- PREFERRED -- therefor.

In column 3, line 25: delete "attaching" and substitute -- attacking -- therefore.

Signed and Sealed this

Twenty-first Day of February, 1989

Attest:

DONALD J. QUIGG

*Attesting Officer*  *Commissioner of Patents and Trademarks*